US012586806B2

(12) United States Patent
Kanno

(10) Patent No.: US 12,586,806 B2
(45) Date of Patent: Mar. 24, 2026

(54) BIPOLAR PLATE, CELL FRAME, BATTERY CELL, CELL STACK, AND REDOX FLOW BATTERY

(71) Applicant: Sumitomo Electric Industries, Ltd., Osaka (JP)

(72) Inventor: Takashi Kanno, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 496 days.

(21) Appl. No.: 18/028,371

(22) PCT Filed: Sep. 29, 2020

(86) PCT No.: PCT/JP2020/036934
§ 371 (c)(1),
(2) Date: Mar. 24, 2023

(87) PCT Pub. No.: WO2022/070260
PCT Pub. Date: Apr. 7, 2022

(65) Prior Publication Data
US 2023/0395837 A1 Dec. 7, 2023

(51) Int. Cl.
*H01M 8/18* (2006.01)
*H01M 4/86* (2006.01)

(52) U.S. Cl.
CPC ............. *H01M 8/188* (2013.01); *H01M 4/86* (2013.01); *H01M 2004/8694* (2013.01)

(58) Field of Classification Search
CPC .................. H01M 8/188; H01M 4/86; H01M 2004/8694; H01M 8/02; H01M 8/0247; H01M 8/0258; H01M 8/026; H01M 8/0273; H01M 8/2483; H01M 8/18; Y02E 60/50

USPC .......................................................... 429/105
See application file for complete search history.

(56) References Cited

U.S. PATENT DOCUMENTS

| | | | |
|---|---|---|---|
| 2008/0038609 A1* | 2/2008 | Yoshizawa ............ | H01M 8/023 |
| | | | 429/514 |
| 2009/0075154 A1* | 3/2009 | Madeleine .......... | H01M 8/0271 |
| | | | 429/413 |
| 2016/0240868 A1* | 8/2016 | Warrington ......... | H01M 8/2483 |

(Continued)

FOREIGN PATENT DOCUMENTS

| | | |
|---|---|---|
| JP | 2-148659 A | 6/1990 |
| JP | 2004-030959 A | 1/2004 |
| JP | 2015-505147 A | 2/2015 |

(Continued)

*Primary Examiner* — Christian Roldan
(74) *Attorney, Agent, or Firm* — Volpe Koenig

(57) ABSTRACT

Provided is a bipolar plate including a first surface and a second surface facing each other, in which each of the first surface and the second surface includes a first edge, a second edge, and a middle region, the middle region includes a plurality of groove portions through which the electrolyte flows, the middle region includes a specific cross section obtained by cutting the bipolar plate in a specific direction, the specific direction is a direction orthogonal to a direction from the first edge toward the second edge, the specific cross section is a cross section having a cross-sectional area ratio B/(A+B) greater than or equal to 0.05 and less than or equal to 0.60, A is a cross-sectional area of the bipolar plate, and B is a total cross-sectional area of the plurality of groove portions.

11 Claims, 4 Drawing Sheets

(56) References Cited

U.S. PATENT DOCUMENTS

2018/0190999 A1*  7/2018  Fujita ................... H01M 8/188
2019/0245238 A1    8/2019  Ito et al.

FOREIGN PATENT DOCUMENTS

WO    2013/095378 A1    6/2013
WO    2016/208482 A1    12/2016

* cited by examiner

BIPOLAR PLATE, CELL FRAME, BATTERY CELL, CELL STACK, AND REDOX FLOW BATTERY

TECHNICAL FIELD

The present disclosure relates to a bipolar plate, a cell frame, a battery cell, a cell stack, and a redox flow battery.

BACKGROUND ART

Patent Literature 1 discloses a bipolar plate including a plurality of groove portions through which an electrolyte flows on at least one of a first surface and a second surface facing each other. The bipolar plate is used in a redox flow battery in a form called a cell frame in which a frame body is disposed on an outer periphery of the bipolar plate.

CITATION LIST

Patent Literature

PTL 1: WO 2016/208482 A

SUMMARY OF INVENTION

A bipolar plate of the present disclosure is a bipolar plate including a first surface and a second surface facing each other, in which each of the first surface and the second surface includes a first edge, a second edge, and a middle region, the first edge is an edge located on a side to which an electrolyte is supplied, the second edge is an edge located on a side from which the electrolyte is discharged, the middle region is a region within 20% of an edge interval from a middle line toward each of the first edge and the second edge, the middle line is a line bisecting a portion between the first edge and the second edge, the edge interval is an interval between the first edge and the second edge, the middle region on at least one of the first surface and the second surface includes a plurality of groove portions through which the electrolyte flows, the middle region includes a specific cross section obtained by cutting the bipolar plate in a specific direction, the specific direction is a direction orthogonal to a direction from the first edge toward the second edge, the specific cross section is a cross section having a cross-sectional area ratio B/(A+B) greater than or equal to 0.05 and less than or equal to 0.60, A is a cross-sectional area of the bipolar plate, and B is a total cross-sectional area of the plurality of groove portions.

A cell frame of the present disclosure includes:

the bipolar plate of the present disclosure; and a frame body provided on an outer periphery of the bipolar plate.

A battery cell of the present disclosure includes the cell frame of the present disclosure.

A cell stack of the present disclosure includes the plurality of battery cells of the present disclosure.

A redox flow battery of the present disclosure includes the battery cell of the present disclosure or a cell stack of the present disclosure.

DETAILED DESCRIPTION

Figure 1:
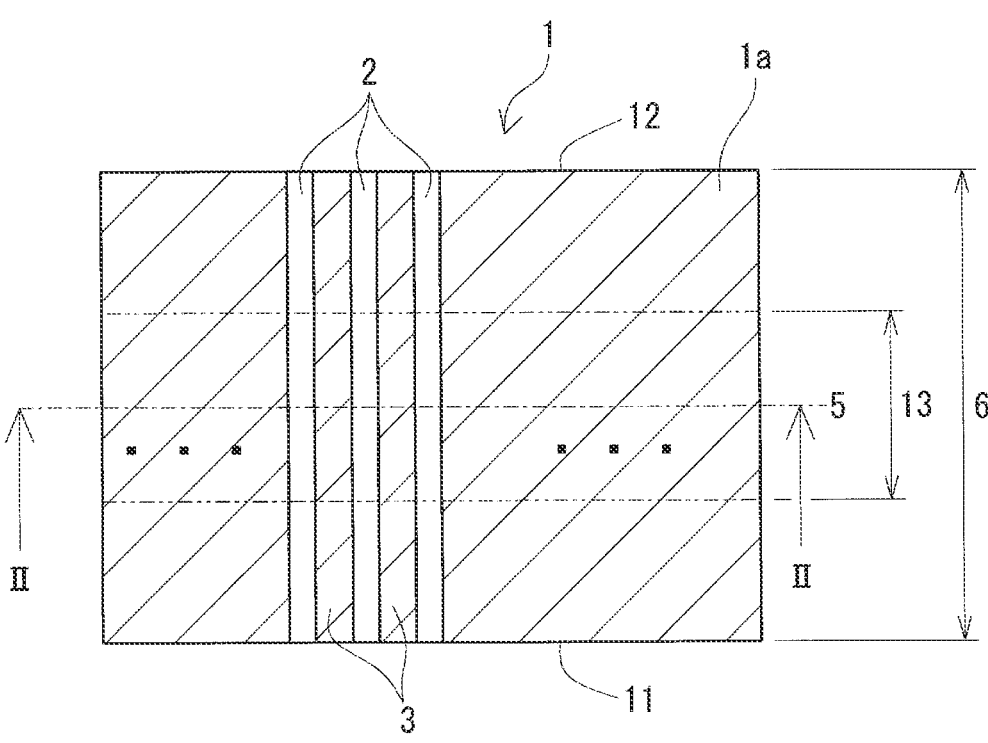
FIG. 1 is a plan view illustrating a bipolar plate according to an embodiment.

Problem to be Solved by the Present Disclosure

During operation of a redox flow battery, thermal stress due to flow of an electrolyte acts on a bipolar plate. A cell frame is required not to be damaged by this thermal stress of the bipolar plate. In addition, the redox flow battery is required to have high current efficiency.

Therefore, one object of the present disclosure is to provide a bipolar plate capable of suppressing damage to a cell frame due to thermal stress and obtaining a battery cell having high current efficiency. Another object of the present disclosure is to provide a cell frame capable of suppressing the damage to the cell frame due to the thermal stress and obtaining a battery cell having high current efficiency. Still another object of the present disclosure is to provide a battery cell, a cell stack and a redox flow battery capable of suppressing the damage to the cell frame due to the thermal stress and having high current efficiency.

Advantageous Effect of the Present Disclosure

A bipolar plate and a cell frame of the present disclosure can suppress the damage to the cell frame due to thermal stress and obtaining a battery cell having high current efficiency. A battery cell, a cell stack, and a redox flow battery of the present disclosure can suppress the damage to the cell frame due to thermal stress, and have high current efficiency.

DESCRIPTION OF EMBODIMENTS

When a single bipolar plate is thick, mechanical characteristics including rigidity are high, and the damage due to thermal stress hardly occurs. However, it has been found that when the bipolar plate is combined with a frame body and used as a cell frame for a battery cell, if the bipolar plate is thick, the damage may occur in a joining portion between the bipolar plate and the frame body, and a vicinity thereof. In addition, when the bipolar plate is thick, a current efficiency of the battery cell tends to be low.

As a result of examining a size of each of the groove portions in a specific region in the bipolar plate including the groove portions, it has been found that it is possible to suppress the occurrence of the damage due to thermal stress at the joining portion between the bipolar plate and the frame body and the vicinity thereof, and it is possible to obtain a battery cell having high current efficiency. The present disclosure defines a cross-sectional area ratio between the bipolar plate and the plurality of groove portions in a specific cross section of the bipolar plate on the basis of the above findings.

First, embodiments of the present disclosure will be listed and described.

(1) A bipolar plate according to one aspect of the present disclosure is a bipolar plate including a first surface and a second surface facing each other, in which each of the first surface and the second surface includes a first edge, a second edge, and a middle region, the first edge is an edge located on a side to which an electrolyte is supplied, the second edge is an edge located on a side from which the electrolyte is discharged, the middle region is a region within 20% of an edge interval from a middle line toward each of the first edge and the second edge, the middle line is a line bisecting a portion between the first edge and the second edge, the edge interval is an interval between the first edge and the second edge, the middle region on at least one of the first surface and the second surface includes a plurality of groove portions through which the electrolyte flows, the middle region includes a specific cross section obtained by cutting the bipolar plate in a specific direction, the specific direction is a direction orthogonal to a direction from the first edge toward the second edge, the specific cross section is a cross section having a cross-sectional area ratio $B/(A+B)$ greater than or equal to 0.05 and less than or equal to 0.60, A is a cross-sectional area of the bipolar plate, and B is a total cross-sectional area of the plurality of groove portions.

In the bipolar plate having a cross-sectional area ratio greater than or equal to 0.05, it can be said that the groove portions are secured to some extent. The bipolar plate having a cross-sectional area ratio greater than or equal to 0.05 has low rigidity as compared with a bipolar plate having an extremely small number of groove portions. Since the rigidity of the bipolar plate is low, it is possible to suppress the occurrence of the damage to at least one of the bipolar plate and the frame body at the joining portion between the bipolar plate and the frame body and in the vicinity thereof even when thermal stress acts on the bipolar plate.

In the bipolar plate having a cross-sectional area ratio less than or equal to 0.60, it can be said that a substantial portion constituting the bipolar plate is secured to some extent. Therefore, it is possible to suppress the occurrence of the damage to the bipolar plate itself due to excessively low rigidity of the bipolar plate. When a large number of groove portions are secured, an area of the bipolar plate wetted with the electrolyte may increase, and the electrolyte may penetrate into the bipolar plate. It can be said that the bipolar plate having a cross-sectional area ratio less than or equal to 0.60 has a smaller area wetted with the electrolyte than the bipolar plate having a cross-sectional area ratio greater than 0.60, that is, the bipolar plate having an extremely large number of groove portions. Since this wetted area is small, the electrolyte hardly penetrates the bipolar plate. As a result, it is possible to restrain the electrolyte from flowing between the first surface and the second surface of the bipolar plate. Therefore, it is possible to suppress mixing of the electrolyte flowing through the first surface and the electrolyte flowing through the second surface. It is possible to suppress the occurrence of self-discharging in the battery cell due to the mixing. As a result, it is possible to suppress a decrease in current efficiency of the battery cell.

(2) As one example of the bipolar plate of the present disclosure, a form is cited in which a thickness of the bipolar plate is greater than or equal to 2 mm and less than or equal to 15 mm.

Since the thickness of the bipolar plate is greater than or equal to 2 mm, it is easy to secure the substantial portion constituting the bipolar plate and to suppress the penetration of the electrolyte into the bipolar plate. On the other hand, since the thickness of the bipolar plate is less than or equal to 15 mm, it is easy to restrain the rigidity of the bipolar plate from becoming too high. In addition, since the thickness of the bipolar plate is less than or equal to 15 mm, it is easy to suppress an increase in thickness of the bipolar plate and to suppress a decrease in current efficiency of the battery cell.

(3) As one example of the bipolar plate of the present disclosure, a form is cited in which a cross-sectional area of each of the plurality of groove portions is greater than or equal to 0.8 mm$^2$ and less than or equal to 8 mm$^2$.

Since the cross-sectional area of each of the groove portions is greater than or equal to 0.8 mm$^2$, it is easy to restrain the rigidity of the bipolar plate from becoming too high. Since the cross-sectional area of each of the groove portions is greater than or equal to 0.8 mm$^2$, it is easy to secure flowability of the electrolyte. On the other hand, since the cross-sectional area of each of the groove portions is less than or equal to 8 mm$^2$, it is easy to secure the substantial portion constituting the bipolar plate, and it is easy to suppress the penetration of the electrolyte into the bipolar plate.

(4) As one example of the bipolar plate of the present disclosure, a form is cited in which a groove depth of each of the plurality of groove portions is greater than or equal to 0.7 mm and less than or equal to 7 mm.

Since the groove depth is greater than or equal to 0.7 mm, it is easy to restrain the rigidity of the bipolar plate from becoming too high. In addition, since the groove depth is greater than or equal to 0.7 mm, it is easy to secure the flowability of the electrolyte. On the other hand, since the groove depth is less than or equal to 7 mm, it is easy to secure the substantial portion constituting the bipolar plate, and it is easy to suppress the penetration of the electrolyte into the bipolar plate.

(5) As one example of the bipolar plate of the present disclosure, a form is cited in which a groove width of each of the plurality of groove portions is greater than or equal to 0.6 mm and less than or equal to 6 mm.

Since the groove width is greater than or equal to 0.6 mm, it is easy to restrain the rigidity of the bipolar plate from becoming too high. In addition, since the groove width is greater than or equal to 0.6 mm, it is easy to secure the flowability of the electrolyte. On the other hand, since the groove width is less than or equal to 6 mm, it is easy to secure the substantial portion constituting the bipolar plate, and it is easy to suppress the penetration of the electrolyte into the bipolar plate.

(6) As one example of the bipolar plate of the present disclosure, a form is cited in which a distance between the adjacent groove portions is greater than or equal to 1 mm and less than or equal to 10 mm.

Since the distance between the adjacent groove portions is greater than or equal to 1 mm, it is easy to secure the substantial portion constituting the bipolar plate, and it is easy to suppress the penetration of the electrolyte into the bipolar plate. On the other hand, since the distance between the adjacent groove portions is less than or equal to 10 mm, it is easy to secure the groove portions, and it is easy to restrain the rigidity of bipolar plate from becoming too high.

(7) As one example of the bipolar plate of the present disclosure, a form is cited in which 80% or more groove portions of the plurality of groove portions are equal to each other in cross-sectional shape.

In the above embodiment, it is easy to manufacture a bipolar plate satisfying the cross-sectional area ratio.

(8) A cell frame according to one aspect of the present disclosure includes:

the bipolar plate according to any one of (1) to (7) described above; and a frame body provided on an outer periphery of the bipolar plate.

Since the cell frame of the present disclosure includes the bipolar plate of the present disclosure, even if thermal stress acts on the bipolar plate, at least one of the bipolar plate and the frame body can be restrained from being damaged at the joining portion between the bipolar plate and the frame body and in the vicinity thereof. In addition, since the cell frame of the present disclosure includes the bipolar plate of the present disclosure, it is possible to suppress a decrease in current efficiency of the battery cell.

(9) A battery cell according to one aspect of the present disclosure includes the cell frame of (8) described above.

Since the battery cell of the present disclosure includes the cell frame of the present disclosure, the damage to the cell frame due to thermal stress can be suppressed, and the current efficiency is high.

(10) A cell stack according to one aspect of the present disclosure includes a plurality of the battery cells of (9) described above.

Since the cell stack of the present disclosure includes the battery cells of the present disclosure, the damage to the cell frame due to thermal stress can be suppressed, and the current efficiency is high.

(11) A redox flow battery according to an aspect of the present disclosure includes the battery cell of (9) described above or the cell stack of (10) described above.

Since the redox flow battery of the present disclosure includes the battery cell of the present disclosure or the cell stack of the present disclosure, the redox flow battery of the present disclosure can suppress the damage to the cell frame due to thermal stress, and has high current efficiency.

Description of Embodiments

Details of a bipolar plate, a cell frame, a battery cell, a cell stack, and a redox flow battery of embodiments of the present disclosure will be described with reference to the drawings. Hereinafter, the redox flow battery is referred to as an RF battery. In the drawings, the same reference signs indicate the same names <Bipolar Plate>

Overview

Figure 2:
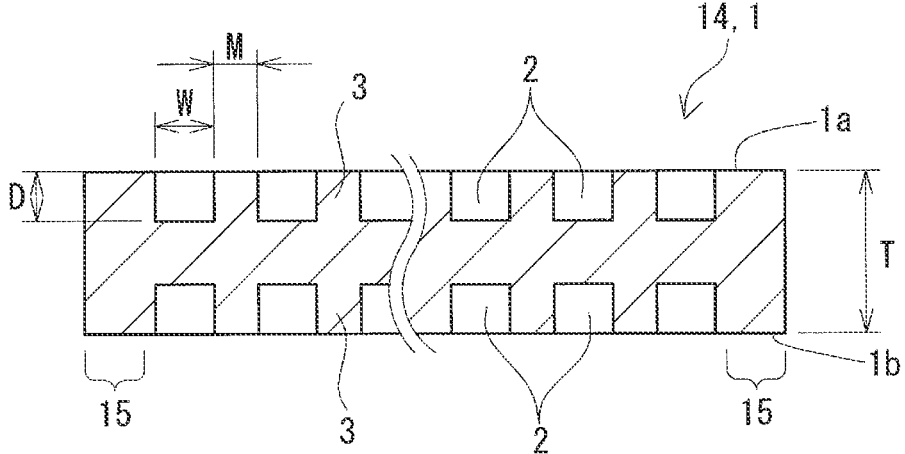
FIG. 2 is a cross-sectional view taken along line II-II of FIG. 1.

Referring to FIGS. 1 and 2, a bipolar plate 1 of an embodiment will be described. FIG. 1 is a plan view of bipolar plate 1 as viewed from a first surface 1a side. Bipolar plate 1 includes a plurality of groove portions 2. In FIG. 1, only three adjacent groove portions 2 among the plurality of groove portions 2 are illustrated, and the other groove portions are omitted by " . . . (dot)". In FIG. 1, a region other than groove portions 2 is hatched for easy understanding. FIG. 2 illustrates a specific cross section 14 in a middle region 13 (FIG. 1) of bipolar plate 1. In specific cross section 14, a cross-sectional area of the bipolar plate is A, and a total cross-sectional area of the plurality of groove portions 2 is B. One of the features of bipolar plate 1 of the embodiment is that a cross-sectional area ratio represented by B/(A+B) is greater than or equal to 0.05 and less than or equal to 0.60 in specific cross section 14.

[Basic Constitution]

Figure 4:
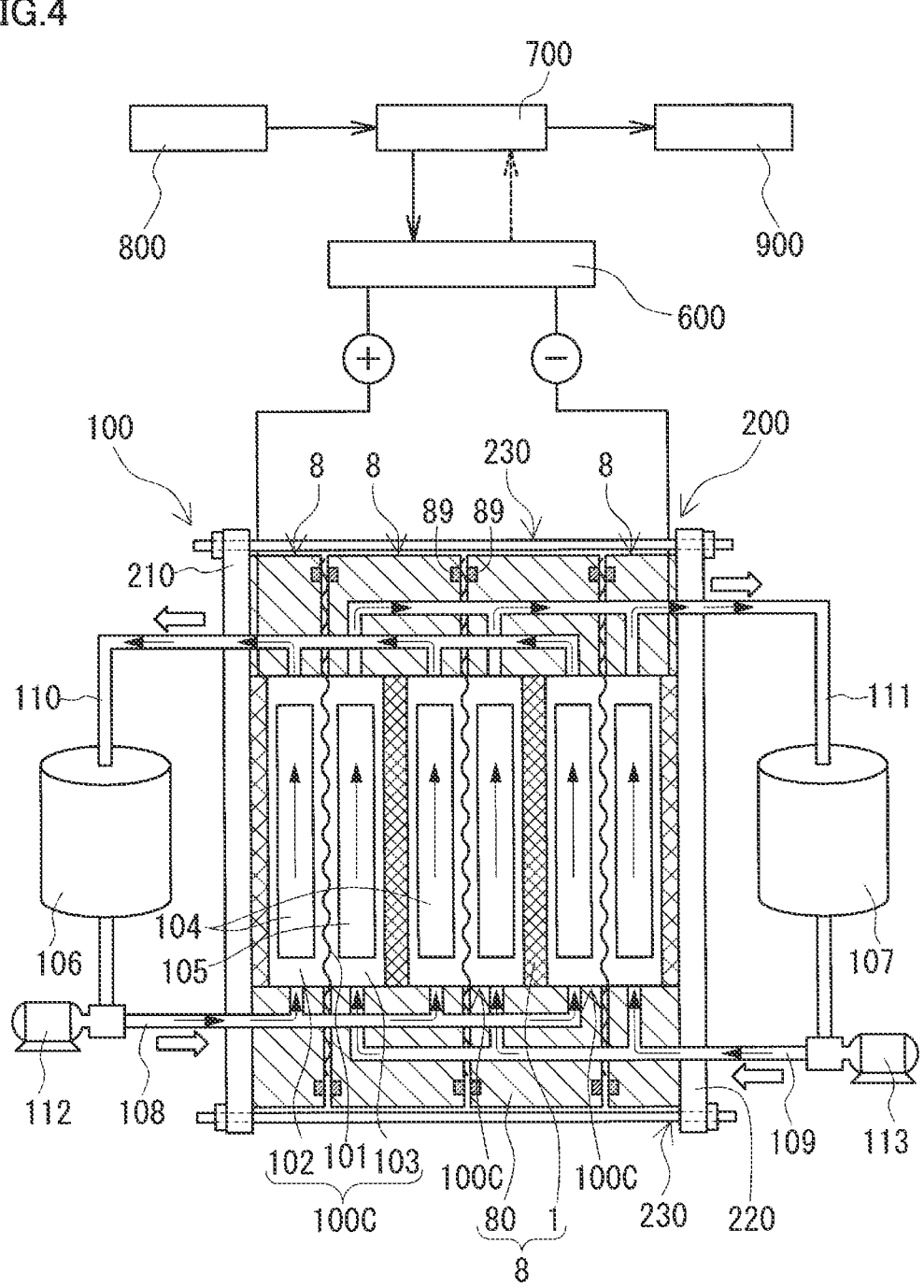
FIG. 4 is an explanatory view schematically illustrating a basic structure of a redox flow battery according to an embodiment.

Bipolar plate 1 is a component of an RF battery 100 (FIG. 4). Bipolar plate 1 is a conductive flat plate that partitions a positive electrolyte and a negative electrolyte flowing in each battery cell 100C (FIG. 4). As illustrated in FIGS. 1 and 2, bipolar plate 1 includes a first surface 1a and a second surface 1b facing each other. As illustrated in FIG. 1, first surface 1a includes a first edge 11, a second edge 12, and middle region 13. Although not illustrated, second surface 1b also includes a first edge, a second edge, and a middle region similarly to first surface 1a.

Figure 3:
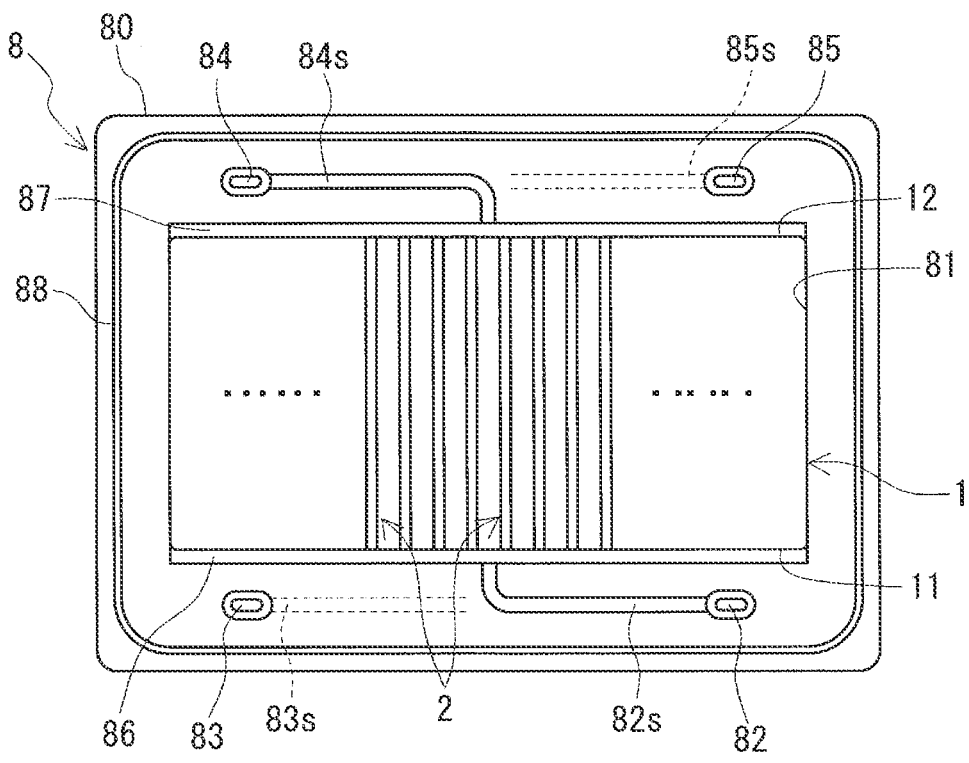
FIG. 3 is a plan view illustrating a cell frame according to an embodiment.

In bipolar plate 1, a frame body 80 (FIG. 3) described later is disposed on an outer periphery of bipolar plate 1 to constitute a cell frame 8. First edge 11 is an edge located on a side to which the electrolyte is supplied. As illustrated in FIG. 3, first edge 11 is an edge located on a side of a supply path provided in frame body 80 in the edges of bipolar plate 1 when cell frame 8 is constituted. The supply path in frame body 80 includes liquid supply manifolds 82, 83, liquid supply slits 82s, 83s, and a liquid-supply rectification portion 86.

Second edge 12 is an edge located on a side from which the electrolyte is discharged. As illustrated in FIG. 3, second edge 12 is an edge located on a side of a discharge path provided in frame body 80 in the edges of bipolar plate 1 when cell frame 8 is constituted. The discharge path in frame body 80 includes liquid discharge manifolds 84, 85, liquid discharge slits 84s, 85s, and a liquid-discharge rectification portion 87.

First edge 11 and second edge 12 are located to face each other. As illustrated in FIG. 1, bipolar plate 1 of the present example is a rectangular flat plate. Therefore, in the present example, first edge 11 and second edge 12 are linear edges facing each other. Therefore, in the present example, an interval between first edge 11 and second edge 12 is uniform along a longitudinal direction of first edge 11 or second edge 12. Hereinafter, the interval between first edge 11 and second edge 12 is referred to as an edge interval 6.

A planar shape of bipolar plate 1 may be a polygonal shape such as a hexagonal shape or an octagonal shape, a circular shape, an elliptical shape, or the like in addition to the rectangular shape. Depending on the planar shape of bipolar plate 1, first edge 11 and second edge 12 may be not linear edges but polygonal lines or curved edges. In this case, edge interval 6 may differ along the longitudinal direction of first edge 11 or second edge 12.

As illustrated in FIG. 1, middle region 13 is a region within 20% of edge interval 6 from a middle line 5 toward each of first edge 11 and second edge 12. Middle line 5 is a line bisecting first edge 11 and second edge 12. Middle line 5 in the present example is a linear line. Depending on the planar shape of bipolar plate 1, middle line 5 may be not a linear line but a polygonal line or a curved line. A constant value is adopted for edge interval 6. When edge interval 6 differs along the longitudinal direction of first edge 11 or second edge 12, a maximum value is adopted as edge interval 6. For example, when the planar shape of bipolar plate 1 is circular, edge interval 6 is a diameter. A length of middle region 13 in a direction orthogonal to the longitudinal direction of middle line 5 is uniform along the longitudinal direction of middle line 5.

Middle region 13 on at least one of first surface 1*a* and second surface 1*b* includes the plurality of groove portions 2. In the present example, as illustrated in FIG. 2, the plurality of groove portions 2 are provided in middle region 13 (FIG. 1) of each of first surface 1*a* and second surface 1*b*.

[Groove Portion]

The electrolyte flows through the plurality of groove portions 2. The positive electrolyte flows through the plurality of groove portions 2 provided on first surface 1*a*. The negative electrolyte flows through the plurality of groove portions 2 provided on second surface 1*b*. The flow of the electrolyte is adjusted by adjusting a shape and dimensions of each of groove portions 2.

As illustrated in FIG. 1, each of groove portions 2 of the present example is constituted to connect first edge 11 and second edge 12. Each of groove portions 2 of the present example is constituted of a single groove connecting first edge 11 and second edge 12. Each of groove portions 2 in middle region 13 is a part of the single groove portion 2. In the present example, all the groove portions 2 are constituted of linear grooves along the direction from first edge 11 toward second edge 12. A width of each of groove portions 2 may be uniform in the longitudinal direction of groove portions 2, may be widened from first edge 11 toward second edge 12, may be conversely narrowed, or may differ in the longitudinal direction of groove portions 2. In addition, each of groove portions 2 may be divided in a longitudinal direction of groove portions 2. In addition, each of groove portions 2 may be bent or curved in the longitudinal direction of groove portions 2. A depth of each of groove portions 2 may be uniform in the longitudinal direction of groove portions 2, may be deeper from first edge 11 toward second edge 12, may be conversely shallower, or may differ in the longitudinal direction of groove portions 2.

Figure 5:
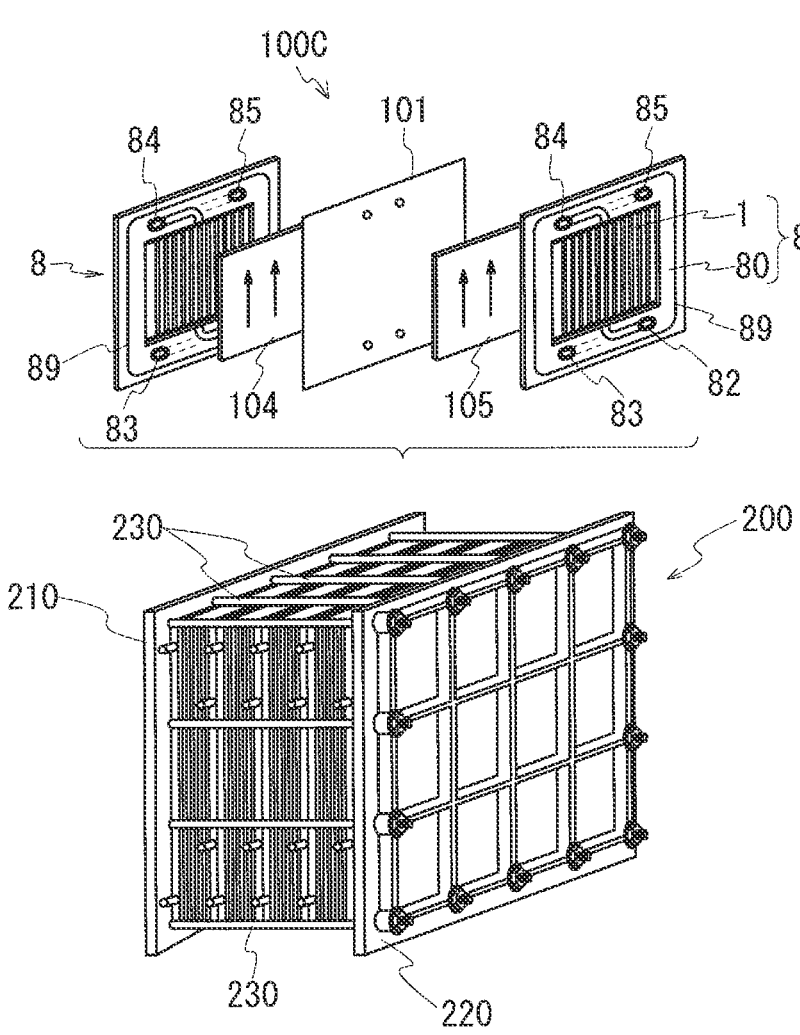
FIG. 5 is a perspective view illustrating an outline of a battery cell according to the embodiment and a cell stack according to an embodiment.

The plurality of groove portions 2 are provided side by side along the longitudinal direction of first edge 11 or second edge 12. As will be described later, bipolar plate 1 is used in a form called cell frame 8 in which frame body 80 is disposed on the outer periphery of bipolar plate 1 (FIGS. 3 to 5). The electrolyte flows through an exposed region of bipolar plate 1 exposed from frame body 80. Therefore, the plurality of groove portions 2 are uniformly provided in the exposed region. The electrolyte does not flow through a covered region 15 (FIG. 2) of bipolar plate 1 overlapping frame body 80. In covered region 15, frame body 80 may overlap both surfaces of first surface 1*a* and second surface 1*b*, or frame body 80 may overlap only one of first surface 1*a* and second surface 1*b*. Therefore, the plurality of groove portions 2 are uniformly provided not only in a center of the exposed region, but up to a vicinity of covered region 15.

A ridge portion 3 is constituted between adjacent groove portions 2. Ridge portions 3 constitute most of an outermost surface of bipolar plate 1. When battery cells 100C (FIGS. 4, 5) described later are constructed, ridge portions 3 on first surface 1*a* contact positive electrodes 104, and ridge portions 3 on second surface 1*b* contact negative electrodes 105. In each of battery cells 100C, a flow of the electrolyte on bipolar plate 1 constitutes a flow along each of groove portions 2 and a flow running between adjacent groove portions 2 across ridge portion 3.

Middle region 13 of bipolar plate 1 has specific cross section 14 (FIG. 2) obtained by cutting bipolar plate 1 in a specific direction. The specific direction is a direction orthogonal to the direction from first edge 11 toward second edge 12. The direction from first edge 11 toward second edge 12 is a flowing direction of the electrolyte when viewed from entire bipolar plate 1. In battery cell 100C of the present example, as illustrated in FIG. 5, the electrolyte flows in a direction from a lower side to an upper side in a vertical direction. Therefore, the specific direction in the present example is a horizontal direction. Specific cross section 14 is constituted of a plane, whichever of a linear line, a polygonal line, a curved line, or the like middle line 5 is. In addition, specific cross section 14 is constituted of a plane even when edge interval 6 differs along the longitudinal direction of first edge 11 or second edge 12. Specific cross section 14 does not partially include a region other than middle region 13, and includes middle region 13 over the entire region.

Specific cross section 14 includes the plurality of groove portions 2 on at least one of first surface 1*a* and second surface 1*b*. As illustrated in FIG. 2, specific cross section 14 of the present example includes the plurality of groove portions 2 in each of first surface 1*a* and second surface 1*b*.

When the plurality of groove portions 2 are provided on both first surface 1*a* and second surface 1*b*, groove portions 2 provided on first surface 1*a* and groove portions 2 provided on second surface 1*b* may overlap each other in a plan view of bipolar plate 1 as illustrated in FIG. 2. When bipolar plate 1 is viewed in a plan view, groove portions 2 provided on first surface 1*a* and groove portions 2 provided on second surface 1*b* may partially overlap each other or may not overlap each other by being shifted from each other.

In specific cross section 14, the cross-sectional area of bipolar plate 1 is A. Cross-sectional area A of bipolar plate 1 is a cross-sectional area of a substantial portion of bipolar plate 1. Cross-sectional area A of bipolar plate 1 is a cross-sectional area of the hatched portion illustrated in FIG. 2.

In specific cross section 14, the total cross-sectional area of the plurality of groove portions 2 is B. A cross-sectional area of each of groove portions 2 is a cross-sectional area of a region surrounded by a linear line and an inner peripheral edge of groove portion 2, the linear line being obtained by connecting opening edges of groove portion 2. The cross-sectional area of each of groove portions 2 is a cross-sectional area of a white rectangular portion illustrated in FIG. 2. Total cross-sectional area B of the plurality of groove portions 2 is a sum of the cross-sectional areas of groove portions 2.

<<Cross-Sectional Area Ratio>>

The cross-sectional area ratio represented by $B/(A+B)$ is greater than or equal to 0.05 and less than or equal to 0.60 in specific cross section 14. In bipolar plate 1 having a cross-sectional area ratio greater than or equal to 0.05, it can be said that groove portions 2 are secured to some extent. Since groove portions 2 are secured to some extent, it is easy to secure the flowability of the electrolyte. In addition, since groove portions 2 are secured to some extent, the presence of groove portions 2 can restrain the rigidity of bipolar plate 1 from becoming too high. Since the rigidity of bipolar plate 1 is not too high, it is possible to suppress the occurrence of damage to at least one of bipolar plate 1 and frame body 80 at a joining portion between bipolar plate 1 and frame body 80 and in a vicinity thereof even when thermal stress acts on bipolar plate 1.

On the other hand, in bipolar plate 1 having a cross-sectional area ratio less than or equal to 0.60, it can be said that the substantial portion constituting bipolar plate 1 is secured to some extent. Therefore, it is possible to suppress the occurrence of damage to bipolar plate 1 itself due to excessively low rigidity of bipolar plate 1. In addition, in bipolar plate 1 having a cross-sectional area ratio less than or equal to 0.60, it can be said that an increase in the area wetted with the electrolyte is suppressed. Bipolar plate 1 is made of a material that does not allow the electrolyte to pass therethrough. However, when bipolar plate 1 includes groove portions 2, an area of bipolar plate 1 wetted with the electrolyte may increase, and the electrolyte may penetrate into bipolar plate 1. When the cross-sectional area ratio is less than or equal to 0.60, it is difficult for the electrolyte to penetrate into bipolar plate 1. As a result, it is possible to suppress the electrolyte from flowing between first surface 1*a* and second surface 1*b* of bipolar plate 1. Therefore, it is possible to suppress mixing of the electrolyte flowing through first surface 1*a* and the electrolyte flowing through second surface 1*b*. As a result, it is possible to suppress the occurrence of self-discharging in battery cells 100C (FIGS. 4, 5) due to the mixing. Since the self-discharging can be suppressed, the current efficiency of battery cell 100C can be suppressed from being lowered.

The cross-sectional area ratio is further preferably greater than or equal to 0.10 and less than or equal to 0.40, and particularly preferably greater than or equal to 0.15 and less than or equal to 0.30 or less.

In middle region 13, a plurality of cross sections cut in the specific direction can be taken. At least one of the plurality of cross sections may be specific cross section 14 satisfying the cross-sectional area ratio. In middle region 13, five or more cross sections are taken at equal intervals. In this case, it is preferable that 80% or more, further 90% or more, and particularly all of the cross sections among the five or more cross sections are specific cross sections 14 satisfying the cross-sectional area ratio.

<<Groove Shape>>

In specific cross section 14, as a cross-sectional shape of each of groove portions 2, any shape can be selected. Examples of the cross-sectional shape of each of groove portions 2 include a rectangular shape, a semicircular shape, a V-shape, a U-shape, a trapezoidal shape in which an opening width of groove portion 2 is wider than a width of a bottom surface, and a dovetail groove shape in which the opening width of groove portion 2 is narrower than the width of the bottom surface. The cross-sectional shapes of all groove portions 2 may be the same, or groove portions 2 having different cross-sectional shapes may be included. When a number of the plurality of groove portions 2 is 100%, 80% or more groove portions of the plurality of groove portions 2 preferably have the same cross-sectional shape. The same cross-sectional shape means that cross-sectional shapes at the same position in the longitudinal direction in each of groove portions 2 are congruent or similar. Since 80% or more of the plurality of groove portions 2 have the same cross-sectional shape, it is easy to manufacture bipolar plate 1 satisfying the cross-sectional area ratio. Particularly, when the number of the plurality of groove portions 2 is 100%, 80% or more groove portions of the plurality of groove portions 2 are preferably congruent. Since 80% or more of the plurality of groove portions 2 are congruent, a flowing state of the electrolyte easily becomes uniform. From the viewpoint of the above-described ease of manufacturing, 85% or more and further 90% or more of the plurality of groove portions 2 may have the same cross-sectional shape. In addition, from the viewpoint of the above-described ease of manufacturing and uniformity of the flowing state of the electrolyte, 85% or more and further 90% or more of the plurality of groove portions 2 may be congruent. The cross-sectional shapes of all groove portions 2 may be the same.

<<Groove Cross-Sectional Area Ratio>>

In specific cross section 14, the cross-sectional area of each of groove portions 2 is preferably greater than or equal to 0.8 mm$^2$ and less than or equal to 8 mm$^2$. Since the cross-sectional area of each of groove portions 2 is greater than or equal to 0.8 mm$^2$, it is easy to secure the flowability of the electrolyte. In addition, since the cross-sectional area of each of groove portions 2 is greater than or equal to 0.8 mm$^2$, it is easy to restrain the rigidity of bipolar plate 1 from becoming too high. On the other hand, since the cross-sectional area of each of groove portions 2 is less than or equal to 8 mm$^2$, it is easy to uniformly position groove portions 2 over entire bipolar plate 1. By doing so, it is easy to suppress the occurrence of rigidity bias in bipolar plate 1. The cross-sectional area of each of groove portions 2 is further preferably greater than or equal to 1 mm$^2$ and less than or equal to 4 mm$^2$, and particularly preferably greater than or equal to 1.5 mm$^2$ and less than or equal to 3 mm$^2$. When the plurality of specific cross sections 14 are taken, each of specific cross sections 14 preferably satisfies the cross-sectional area of each of groove portions 2.

<<Groove Depth>>

In specific cross section 14, a groove depth D of each of groove portions 2 is preferably greater than or equal to 0.7 mm and less than or equal to 7 mm. Groove depth D is a length from the linear line connecting the opening edges of groove portion 2 to a farthest place of a groove bottom. Since groove depth D is greater than or equal to 0.7 mm, it is easy to secure the flowability of the electrolyte. In addition, since groove depth D is greater than or equal to 0.7 mm, it is easy to restrain the rigidity of bipolar plate 1 from becoming too high. On the other hand, since the groove depth D is less than or equal to 7 mm, it is easy to secure the substantial portion constituting bipolar plate 1, and it is easy to suppress penetration of the electrolyte into bipolar plate 1. Groove depth D of each of groove portions 2 is further preferably greater than or equal to 1 mm and less than or equal to 4 mm, and preferably greater than or equal to 1 mm and less than or equal to 3 mm, particularly preferably greater than or equal to 1 mm and less than or equal to 2 mm Groove depth D of each of groove portions 2 may be greater than or equal to 1.4 mm. When the plurality of specific cross sections 14 are taken, each of specific cross sections 14 preferably satisfies groove depth D of each of groove portions 2.

In specific cross section 14, groove depth D of each of groove portions 2 is preferably greater than or equal to 12% and less than or equal to 39% of a thickness T of bipolar plate 1. Since groove depth D is greater than or equal to 12% of thickness T of bipolar plate 1, it is easy to secure the flowability of the electrolyte. In addition, since groove depth D is greater than or equal to 12% of thickness T of bipolar plate 1, it is easy to restrain the rigidity of bipolar plate 1 from becoming too high. On the other hand, since groove depth D is less than or equal to 39% of thickness T of bipolar plate 1, it is easy to secure the substantial portion constituting bipolar plate 1, and it is easy to suppress the penetration of the electrolyte into bipolar plate 1. Groove depth D of each of groove portions 2 is further preferably greater than or equal to 15% and less than or equal to 33% of thickness T of bipolar plate 1, and particularly preferably greater than or equal to 18% and less than or equal to 25%.

<<Groove Width>>

In specific cross section 14, a groove width W of each of groove portions 2 is preferably greater than or equal to 0.6 mm and less than or equal to 6 mm. When groove width W is not uniform from the opening edge of groove portion 2 toward the groove bottom, groove width W is set to a largest width. Since groove width W is greater than or equal to 0.6 mm, it is easy to secure the flowability of the electrolyte. In addition, since groove width W is greater than or equal to 0.6 mm, it is easy to restrain the rigidity of bipolar plate 1 from becoming too high. On the other hand, since groove width W is less than or equal to 6 mm, it is easy to secure the substantial portion constituting bipolar plate 1, and it is easy to suppress the penetration of the electrolyte into bipolar plate 1. Groove width W of each of groove portions 2 is further preferably greater than or equal to 1 mm and less than or equal to 4 mm, and particularly preferably greater than or equal to 1.2 mm and less than or equal to 3 mm. When the plurality of specific cross sections 14 are taken, each of specific cross sections 14 preferably satisfies groove width W of each of groove portions 2.

<<Inter-Groove Distance>>

In specific cross section 14, an inter-groove distance M between adjacent groove portions 2 is preferably greater than or equal to 1 mm and less than or equal to 10 mm Inter-groove distance M is a width of ridge portion 3. Since inter-groove distance M is greater than or equal to 1 mm, it is easy to secure the substantial portion constituting bipolar plate 1, and it is easy to suppress the penetration of the electrolyte into bipolar plate 1. On the other hand, since inter-groove distance M is less than or equal to 10 mm, it is easy to secure groove portions 2, and it is easy to restrain the rigidity of bipolar plate 1 from becoming too high. Inter-groove distance M is further preferably greater than or equal to 1.1 mm and less than or equal to 7 mm, and particularly preferably greater than or equal to 1.2 mm and less than or equal to 5 mm. Inter-groove distance M may be greater than or equal to 1.5 mm and less than or equal to 7 mm, and particularly may be greater than or equal to 2 mm and less than or equal to 5 mm. When the plurality of specific cross sections 14 are taken, each of specific cross sections 14 preferably satisfies inter-groove distance M.

<<Thickness of Bipolar Plate>>

Thickness T of bipolar plate 1 is preferably greater than or equal to 2 mm and less than or equal to 15 mm. Thickness T of bipolar plate 1 is a length between the outermost surfaces of first surface 1a and second surface 1b in the exposed region of bipolar plate 1 from frame body 80 (FIGS. 4, 5). Since thickness T of bipolar plate 1 is greater than or equal to 2 mm, it is easy to secure the substantial portion constituting bipolar plate 1, and it is easy to suppress the penetration of the electrolyte into bipolar plate 1. On the other hand, since thickness T of bipolar plate 1 is less than or equal to 15 mm, it is easy to restrain the rigidity of bipolar plate 1 from becoming too high. In addition, since the thickness of bipolar plate 1 is less than or equal to 15 mm, it is easy to suppress an increase in thickness of bipolar plate 1 and to suppress a decrease in current efficiency of battery cell 100C (FIGS. 4, 5). Thickness T of bipolar plate 1 is further preferably greater than or equal to 3 mm and less than or equal to 10 mm, and particularly preferably greater than or equal to 4 mm and less than or equal to 8 mm.

In bipolar plate 1 of the present example, covered region 15 where frame body 80 (FIGS. 4, 5) is disposed and the exposed region exposed from frame body 80 are constituted to have substantially same thickness T. Alternatively, covered region 15 may be constituted to be thinner than the exposed region. For example, in a case where a depressed portion (not illustrated) is provided in frame body 80, bipolar plate 1 and frame body 80 can be integrated by fitting covered region 15 constituted of a thin portion into the depressed portion.

<<Constituent Material of Bipolar Plate>>

Examples of a constituent material of bipolar plate 1 include an organic composite material, and a so-called conductive plastic. Examples of the organic composite material include those containing a conductive material such as a carbon-based material or a metal, and an organic material such as a thermoplastic resin. Bipolar plate 1 is obtained by, for example, molding into a plate shape by a known method. Examples of a method for molding the conductive plastic include injection molding, press molding, and vacuum molding. The plurality of groove portions 2 are molded simultaneously when bipolar plate 1 is molded into a plate shape. Alternatively, the plurality of groove portions 2 may be formed by cutting an even flat plate material.

<Cell Frame>

Referring to FIG. 3, cell frame 8 of an embodiment will be described. Cell frame 8 includes bipolar plate 1 and frame body 80. Bipolar plate 1 is bipolar plate 1 of the above-described embodiment. Frame body 80 is provided on the outer periphery of bipolar plate 1. Frame body 80 supports bipolar plate 1.

Frame body 80 is used to supply the electrolyte to positive electrode 104 and negative electrode 105 (FIGS. 4, 5) disposed on the front and back of bipolar plate 1, and to discharge the electrolyte from positive electrode 104 and negative electrode 105. Frame body 80 includes a window portion 81, the supply path of the electrolyte, and the discharge path of the electrolyte. Window portion 81 is provided at a central portion of frame body 80 to expose a region of bipolar plate 1 where positive electrode 104 and negative electrode 105 are disposed. FIG. 2 illustrates a case where an outer shape of frame body 80 is rectangular and a shape of window portion 81 is also rectangular. The outer shape of frame body 80 and the shape of window portion 81 can be appropriately selected.

Typically, frame body 80 includes the supply path and the discharge path of the positive electrolyte on the first surface, and the supply path and the discharge path of the negative electrolyte on the second surface. The supply path of the positive electrolyte includes liquid supply manifold 82, liquid supply slit 82s, and liquid-supply rectification portion 86. Liquid-supply rectification portion 86 of the present example is constituted of a notch formed in an inner peripheral edge of frame body 80. Liquid supply slit 82s connects liquid supply manifold 82 and liquid-supply rectification portion 86. Liquid-supply rectification portion 86 diffuses the positive electrolyte supplied from liquid supply slit 82s along the longitudinal direction of first edge 11 in bipolar plate 1. The discharge path of the positive electrolyte includes liquid discharge manifold 84, liquid discharge slit 84s, and liquid-discharge rectification portion 87. Liquid-discharge rectification portion 87 of the present example is constituted of a notch formed in an inner peripheral edge of frame body 80. Liquid discharge slit 84s connects liquid discharge manifold 84 and liquid-discharge rectification portion 87. Liquid-discharge rectification portion 87 collects the positive electrolyte discharged from bipolar plate 1 and guides the positive electrolyte to liquid discharge slit 84s. Similarly to the supply path of the positive electrolyte, the supply path of the negative electrolyte includes liquid supply manifold 83, liquid supply slit 83s, and a liquid-supply rectification portion (not illustrated). In addition, similarly to the discharge path of the positive electrolyte, the discharge path of the negative electrolyte includes liquid discharge manifold 85, liquid discharge slit 85s, and a liquid-discharge rectification portion (not illustrated). Frame body 80 of the present example is provided with a seal groove 88 along a circumferential direction. In seal groove 88, a seal member 89 (FIGS. 4, 5) is disposed.

Frame body 80 is made of an electrically insulating material. Examples of the electrically insulating material include various resins such as a thermoplastic resin. Examples of the thermoplastic resin include vinyl chloride. Frame body 80 can be constituted, for example, by combining divided pieces. Cell frame 8 can be constituted, for example, by combining and appropriately joining the divided pieces so as to sandwich bipolar plate 1. Examples of a joining method include thermal fusion and compression with a seal member (not illustrated) interposed therebetween. In addition, cell frame 8 can be constituted by fitting bipolar plate 1 into window portion 81 of frame body 80. In addition, cell frame 8 can be constituted by molding frame body 80 on the outer periphery of bipolar plate 1 by injection molding or the like.

<RF Battery>

Referring to FIGS. 4 and 5, RF battery 100 of an embodiment will be described. RF battery 100 is one of electrolyte circulation type storage batteries. RF battery 100 includes battery cells 100C or a cell stack 200, and a circulation mechanism that supplies the electrolyte to battery cells 100C. RF battery 100 performs charging and discharging while supplying the electrolyte to battery cells 100C.

RF battery 100 is typically connected to a power generation unit 800 and a load 900 via a transformer facility 700 and an AC/DC converter 600. RF battery 100 performs charging using power generation unit 800 as a power supply source, and performs discharging using load 900 as a power supply target. Examples of power generation unit 800 include a solar power generator, a wind power generator, and other general power plants. Examples of load 900 include a power system and a consumer of electric power. RF battery 100 is used for load leveling, instantaneous voltage drop compensation, an emergency power supply, output smoothing of natural energy power generation such as solar power generation and wind power generation, and the like.

<Battery Cell>

Battery cell 100C is separated into a positive electrode cell 102 and a negative electrode cell 103 by a membrane 101. Positive electrode cell 102 incorporates positive electrode 104 to which the positive electrolyte is supplied. Negative electrode cell 103 incorporates negative electrode 105 to which the negative electrolyte is supplied. The battery cell 100C is sandwiched between a pair of cell frames 8. Cell frames 8 are each cell frame 8 of the above-described embodiment. Examples of positive electrode 104 and negative electrode 105 include a fiber assembly of a carbon-based material, and a porous metal member. Examples of the fiber assembly of the carbon-based material include carbon felt, carbon paper, and carbon cloth. Examples of membrane 101 include an ion exchange membrane.

When RF battery 100 is a unit cell battery including one battery cell 100C, RF battery 100 includes a multilayer material in which cell frame 8, positive electrode 104, membrane 101, negative electrode 105, and cell frame 8 are laminated in this order. When RF battery 100 is a multicell battery including a plurality of battery cells 100C, RF battery 100 includes a multilayer material in which cell frame 8, positive electrode 104, membrane 101, and negative electrode 105 are repeatedly laminated in this order. This multilayer material is cell stack 200. In cell stack 200, battery cells 100C having the above structure are laminated and connected in series in order to obtain a predetermined output voltage.

<Cell Stack>

Cell stack 200 typically includes the above-described multilayer material including the plurality of battery cells 100C, a pair of end plates 210, 220, and fastening members 230. Examples of fastening members 230 include a coupling member such as a long bolt, and a nut. The pair of end plates 210, 220 is fastened by fastening members 230. This fastening force holds the multilayer body in a laminated state.

Cell stack 200 is used in a form in which a predetermined number of battery cells 100C are used as a sub-stack (not illustrated) and a plurality of sub-stacks are laminated. In cell stack 200, supply/drainage plates (not illustrated) are disposed in contact with cell frames 8 located at both ends in a multilayer direction of battery cells 100C in the sub-stacks and cell stack 200.

<<Circulation Mechanism>>

The circulation mechanism includes a positive electrode circulation mechanism that circulates the positive electrolyte to positive electrode cell 102 and a negative electrode circulation mechanism that circulates the negative electrolyte to negative electrode cell 103. The positive electrode circulation mechanism includes a positive electrolyte tank 106, a supply pipe 108, a return pipe 110, and a pump 112. Positive electrolyte tank 106 stores the positive electrolyte. Supply pipe 108 and return pipe 110 connect positive electrolyte tank 106 and positive electrode cell 102. Pump 112 is provided in supply pipe 108 on the supply side. The negative electrode circulation mechanism includes a negative electrolyte tank 107, a supply pipe 109, a return pipe 111, and a pump 113. Negative electrolyte tank 107 stores the negative electrolyte. Supply pipe 109 and return pipe 111 connect negative electrolyte tank 107 and negative electrode cell 103. Pump 113 is provided in supply pipe 109 on the supply side.

The positive electrolyte is supplied from positive electrolyte tank 106 to positive electrode 104 through supply pipe 108, and is returned from positive electrode 104 to positive electrolyte tank 106 through return pipe 110. The negative electrolyte is supplied from negative electrolyte tank 107 to negative electrode 105 through supply pipe 109, and is returned from negative electrode 105 to negative electrolyte tank 107 through return pipe 111. By circulating the positive electrolyte to positive electrode 104 and the negative electrolyte to negative electrode 105, battery cell 100C performs charging and discharging in association with valence change reaction of active material ions in the electrolyte of each of the electrodes.

As the basic constitution of RF battery 100 described above, a known constitution can be appropriately used.

<Electrolyte>

As the electrolyte, a solution containing ions serving as an active material can be used. Typical examples of the electrolyte include an aqueous solution containing the ions and an acid. As the electrolyte, an electrolyte having a known composition can be used, such as an all-vanadium-based RF battery containing vanadium ions as positive and negative active materials, a Mn—Ti-based RF battery containing manganese ions as a positive electrode active material and containing titanium ions as a negative electrode active material, and the like.

Test Example

A plurality of RF batteries were produced using bipolar plates each having the plurality of groove portions in the middle region of the front and back surfaces. In the present example, as illustrated in FIG. 1, the plurality of groove portions provided on each of the front and back surfaces of each of the bipolar plate were constituted of linear grooves along the direction from the first edge toward the second edge. Further, in the present example, as illustrated in FIG. 2, the plurality of groove portions satisfied the following conditions (1) to (3). (1) The number of groove portions provided on the front surface of the bipolar plate is the same as the number of groove portions provided on the back surface. The number of groove portions described in Table 1 is a total number of groove portions on the front surface and groove portions on the back surface of the bipolar plate. (2) Each of the groove portions is provided such that the groove portions provided on the front surface and the groove portions provided on the back surface overlap each other when the bipolar plate is viewed in a plan view. (3) Each of the groove portions has a rectangular cross-sectional shape. In the present example, all the groove portions have the same cross-sectional shape and the same dimensions. In the present example, as illustrated in Table 1, test specimens A to H were prepared in which thickness T of the bipolar plate, groove depth D of each of the groove portions, groove width W, and the number of groove portions were varied. The cross-sectional area of each of the groove portions is represented by a product of groove depth D and groove width W. Each numerical value shown in Table 1 includes a rounded approximate value. For the dimensions of each of the groove portions, refer to FIG. 2. Each of the bipolar plates had a width of 600 mm. A width of the bipolar plate is a length in a left-right direction in FIG. 2.

element contained in the electrolyte from the front surface or the back surface of the bipolar plate was measured. As the element contained in the electrolyte, sulfur in sulfuric acid was used. A case where the penetration of the electrolyte was not observed in the cross section was evaluated as A, a case where the penetration was observed in a region of 70% or less of the cross section was evaluated as B, and a case where the penetration was observed in 70% or more of the cross section was evaluated as C. The joining state between the bipolar plate and the frame body was visually confirmed after charging and discharging. A case where no peeling was observed between the bipolar plate and the frame body was evaluated as A, a case where small peeling was observed was evaluated as B, and a case where large peeling was observed was evaluated as C. In addition, the current efficiency at the time of charging and discharging was measured. The current efficiency was determined by (discharging time/charging time)×100(%). The results are shown in Table 2.

TABLE 2

| Test Specimen | Penetration of Electrolyte | Joining between Bipolar Plate and Frame Body | Current Efficiency (%) |
|---|---|---|---|
| A | C | A | 65.0 |
| B | B | A | 94.2 |
| C | B | A | 96.7 |
| D | A | A | 98.1 |
| E | A | A | 97.8 |
| F | A | B | 97.4 |
| G | A | B | 96.1 |
| H | A | C | 77.0 |

From Tables 1 and 2, in test specimens A to G each having a cross-sectional area ratio greater than or equal to 0.05, no

TABLE 1

| | Bipolar Plate | | Groove Portion | | | | | | | | |
|---|---|---|---|---|---|---|---|---|---|---|---|
| | | | | | | | Total | | | | |
| Test Specimen | Thickness T (mm) | Cross-Sectional Area A (mm²) | Groove Depth D (mm) | Groove Width W (mm) | Cross-Sectional Area of Each Groove Portion (mm2) | Number of Groove Portions | Cross-Sectional Area B (mm²) | D/T × 100 (%) | Inter-Groove Distance M (mm) | A + B (mm²) | Cross-Sectional Area Ratio B/(A + B) |
| A | 3 | 552 | 1.3 | 2.0 | 2.60 | 480 | 1248 | 43 | 0.5 | 1800 | 0.69 |
| B | 3.2 | 880 | 1.3 | 2.0 | 2.60 | 400 | 1040 | 41 | 1.0 | 1920 | 0.54 |
| C | 4.3 | 1540 | 1.3 | 2.0 | 2.60 | 400 | 1040 | 30 | 1.0 | 2580 | 0.40 |
| D | 6.2 | 2680 | 1.3 | 2.0 | 2.60 | 400 | 1040 | 21 | 1.0 | 3720 | 0.28 |
| E | 7.1 | 3612 | 1.2 | 1.8 | 2.16 | 300 | 648 | 17 | 2.2 | 4260 | 0.15 |
| F | 7.7 | 4080 | 1.2 | 1.5 | 1.80 | 300 | 540 | 16 | 2.5 | 4620 | 0.12 |
| G | 8.7 | 4877 | 1.1 | 1.3 | 1.43 | 240 | 343 | 13 | 3.7 | 5220 | 0.07 |
| H | 10 | 5760 | 1.0 | 1.0 | 1.00 | 240 | 240 | 10 | 4.0 | 6000 | 0.04 |

Charging and discharging were performed using the RF battery of each of the test specimens, and a degree of penetration of the electrolyte into the bipolar plate and a degree of a joining state between the bipolar plate and the frame body were examined. Charging and discharging were performed at 50° C. with a differential pressure between the positive and negative electrodes of 0.1 MPa. The degree of penetration of the electrolyte was examined by observing the cross section of the bipolar plate to determine whether or not elements contained in the electrolyte were contained in the bipolar plate after charging and discharging. Specifically, the cross section was subjected to elemental analysis using an energy dispersive X-ray analyzer (EDX), and the elements contained in the electrolyte were mapped. A depth of the large peeling was observed between the bipolar plate and the frame body. Particularly, in test specimens A to E each having a cross-sectional area ratio greater than or equal to 0.15, no large peeling was substantially observed between the bipolar plate and the frame body. It is considered that this was because that the larger the cross-sectional area ratio was, the more the groove portions were secured, and that the presence of the groove portions could restrain the rigidity of the bipolar plate from becoming too high. It is considered that since the rigidity of the bipolar plate was not too high, even if thermal stress acted on the region of the bipolar plate exposed from the frame body, damage to the bipolar plate and the frame body could be suppressed, and peeling between the bipolar plate and the frame body was suppressed.

From Tables 1 and 2, in test specimens B to H each having a cross-sectional area ratio less than or equal to 0.60, no penetration into the electrolyte was observed between the bipolar plate and the frame body. Particularly, in test specimens D to H each having a cross-sectional area ratio less than or equal to 0.30, no penetration of the electrolyte into the bipolar plate was substantially observed between the bipolar plate and the frame body. It is considered that this is because that as the cross-sectional area ratio was smaller, more substantial portions constituting the bipolar plate could be secured, and that an increase in the area wetted with the electrolyte in the bipolar plate could be suppressed.

Looking at the current efficiency shown in Table 2, it can be seen that test specimens B to G each having a cross-sectional area ratio greater than or equal to 0.05 and less than or equal to 0.60 each have a current efficiency greater than or equal to 90%, which is a high current efficiency. It is considered that this is because test specimens B to G could appropriately secure the rigidity of the bipolar plate and suppress the penetration of the electrolyte into the bipolar plate.

In test specimen A having a cross-sectional area ratio of 0.69, the electrolyte penetrated the entire region of the bipolar plate. Therefore, the current efficiency of test specimen A was as low as 65%. It is considered that this is because that in test specimen A, since the electrolyte penetrated into the bipolar plate, the positive electrolyte flowing on the first surface of the bipolar plate and the negative electrolyte flowing on the second surface were mixed, and that self-discharging occurred. In test specimen H having a cross-sectional area ratio of 0.04, large peeling was observed between the bipolar plate and the frame body. Therefore, the current efficiency of test specimen H was as low as 77%. It is considered that this is because in test specimen H, since the bipolar plate and the frame body were largely peeled, the positive electrolyte and the negative electrolyte were mixed at the joining portion between the bipolar plate and the frame body, and that self-discharging occurred.

REFERENCE SIGNS LIST

1: bipolar plate
1a: first surface, 1b: second surface
11: first edge, 12: second edge
13: middle region, 14: specific cross section, 15: covered region
2: groove portion, 3: ridge portion
5: middle line, 6: edge interval
T: thickness, D: groove depth, W: groove width, M: inter-groove distance
8: cell frame
80: frame body, 81: window portion
82, 83: liquid supply manifold, 84, 85: liquid discharge manifold
82s, 83s: liquid supply slit, 84s, 85s: liquid discharge slit
86: liquid-supply rectification portion, 87: liquid-discharge rectification portion
88: seal groove, 89: sealing member
100: RF battery
100C: battery cell
101: membrane
102: positive electrode cell, 103: negative electrode cell
104: positive electrode, 105: negative electrode 106: positive electrolyte tank, 107: negative electrolyte tank
108, 109: supply pipe, 110, 111: return pipe
112, 113: pump
200: cell stack, 210, 220: end plate, 230: fastening member
600: AC/DC converter, 700: transformer facility, 800: power generation unit, 900: load

The invention claimed is:

1. A bipolar plate comprising a first surface and a second surface facing each other, wherein
   each of the first surface and the second surface includes a first edge, a second edge, and a middle region,
   the first edge is an edge located on a side to which an electrolyte is supplied,
   the second edge is an edge located on a side from which the electrolyte is discharged,
   the middle region is a region within 20% of an edge interval from a middle line toward each of the first edge and the second edge,
   the middle line comprising a center line bisecting a distance between the first edge and the second edge,
   the edge interval is an interval between the first edge and the second edge,
   the middle region on at least one of the first surface and the second surface includes a plurality of groove portions through which the electrolyte flows,
   the middle region includes a specific cross section obtained by cutting the bipolar plate in a specific direction,
   the specific direction is a direction orthogonal to a direction from the first edge toward the second edge,
   the specific cross section is a cross section having a cross-sectional area ratio B/(A+B) greater than or equal to 0.05 and less than or equal to 0.60,
   A is a cross-sectional area of the bipolar plate, and
   B is a total cross-sectional area of the plurality of groove portions.

2. The bipolar plate according to claim 1, wherein a thickness of the bipolar plate is greater than or equal to 2 mm and less than or equal to 15 mm.

3. The bipolar plate according to claim 1, wherein a cross-sectional area of each of the plurality of groove portions is greater than or equal to 0.8 mm2 and less than or equal to 8 mm2.

4. The bipolar plate according to claim 1, wherein a groove depth of each of the plurality of groove portions is greater than or equal to 0.7 mm and less than or equal to 7 mm.

5. The bipolar plate according to claim 1, wherein a groove width of each of the plurality of groove portions is greater than or equal to 0.6 mm and less than or equal to 6 mm.

6. The bipolar plate according to claim 1, wherein a distance between adjacent groove portions of the plurality of groove portions is greater than or equal to 1 mm and less than or equal to 10 mm.

7. The bipolar plate according to claim 1, wherein 80% or more groove portions of the plurality of groove portions are equal to each other in cross-sectional shape.

8. A cell frame comprising:
   the bipolar plate according to claim 1; and
   a frame body provided on an outer periphery of the bipolar plate.

9. A battery cell comprising the cell frame according to claim 8.

10. A cell stack comprising a plurality of the battery cells according to claim 9.

11. A redox flow battery comprising the battery cell according to claim 9.

* * * * *